United States Patent
Kudelski

[11] Patent Number: 5,375,168
[45] Date of Patent: Dec. 20, 1994

[54] METHOD FOR SCRAMBLING AND UNSCRAMBLING A VIDEO SIGNAL

[75] Inventor: Andre Kudelski, Crissier, Switzerland

[73] Assignee: Kudelski S.A. Fabrique D'Enregistreurs Nagra, Switzerland

[21] Appl. No.: 768,751

[22] PCT Filed: Feb. 21, 1991

[86] PCT No.: PCT/CH91/00042

§ 371 Date: Oct. 17, 1991

§ 102(e) Date: Oct. 17, 1991

[87] PCT Pub. No.: WO91/13517

PCT Pub. Date: Sep. 5, 1991

[30] Foreign Application Priority Data

Feb. 21, 1990 [CH] Switzerland ............... 563/90-7

[51] Int. Cl.⁵ ..................................... H04N 7/167
[52] U.S. Cl. ................................. 380/14; 380/10
[58] Field of Search ......................... 380/14, 10, 20

[56] References Cited

U.S. PATENT DOCUMENTS

| | | | |
|---|---|---|---|
| 4,405,942 | 9/1983 | Block et al. | 380/14 |
| 4,673,975 | 6/1987 | Inaba et al. | 380/14 |
| 4,796,299 | 1/1989 | Hamilton | 380/14 |

FOREIGN PATENT DOCUMENTS

| | | | |
|---|---|---|---|
| 0260886 | 3/1988 | European Pat. Off. | |
| 0309984 | 4/1989 | European Pat. Off. | |
| 0325509 | 7/1989 | European Pat. Off. | |
| 0224965 | 12/1984 | Japan | 380/14 |
| 1590579 | 6/1981 | United Kingdom | 380/14 |

OTHER PUBLICATIONS

International Journal of Electronics, vol. 59, No. 4, Oct. 1985, Londres, GB), V. Zacharopoulos et al.: "An analogue scrambling scheme for television signals", pp. 501–509.

*Primary Examiner*—Gilberto Barrón, Jr.
*Attorney, Agent, or Firm*—Davis, Bujold & Streck

[57] ABSTRACT

A scrambling method wherein each image line (23–309) of a frame having been produced in unscrambled form before being scrambled, is given the pseudorandomly determined address (B) of the memory line in the storage memory (8) in which said image line is to be stored on reception; and wherein the moment (or the running order) for broadcasting said image line is determined so that on reception, the image line causes, because it is stored in the memory line to which it was addressed, the image line previously stored at the same address to be output to the television set at the right moment (or in the right order) so that an unscrambled picture is reconstructed.

4 Claims, 2 Drawing Sheets

METHOD FOR SCRAMBLING AND UNSCRAMBLING A VIDEO SIGNAL

The present invention relates to a method for scrambling and unscrambling a video signal comprising steps of, at an emitting site, scrambling the sequences of the video signal in accordance with a predetermined scrambling function which can be different for each sequence, emitting each sequence of such scrambled video signal, then, at a receiving site, unscrambling said sequences of emitted video signal.

The main application of the present invention is in pay-television (pay-TV) systems in which it is essential to scramble the video emission and unscramble or decode the program at the subscriber's location by means of a suitable decoder possessed by a subscriber who is authorized to view the emitted program.

Some methods for scrambling and a corresponding unscrambling are well known and, in such methods, it is aimed to make the emitted image and/or sound incomprehensible or their vision and/or audio uncomfortable.

A method for scrambling consisting of permuting a constant predetermined number of lines of the video frame (or video image) in accordance with a predetermined permuting function is well known. In this case, the unscrambling consists in carrying out the reverse function from the function used during the emission to permute such predetermined number of image lines. As it is not technically easy to thus permute a great number of image lines, the limit is now about 32 permuted image lines.

This well known scrambling method, sometimes called the fixed block inversion method, has a drawback which consists of requiring, at the receiving site, a memory of great size because it is necessary to have, just after sending to the TV set a sequence of 32 lines, several next memorized lines for being capable to send immediately the next image to the TV set. This method is relatively simple to carry out, at an emitting site, but there are problems of security, reliability and the cost at the reception site because of the great number of decoders. On the other hand, this method is not reliable enough relative to some kinds of pirated viewing. In fact, it is possible to recover the permutation order, even if this order frequently varies during the emitting phase.

It can be seen in the example mentioned above that the unscrambling function is almost the same as the scrambling function since both functions have the same nature and are the reciprocal. Further, this function is simple to pirate because it is unconnected with other parameters or informations.

The present invention avoids the above drawbacks.

For this purpose, the method according to the invention is characterised in that, at the transmitting site, a first video sequence is scrambled in accordance with a first scrambling function and another video signal sequence is scrambled in accordance with another scrambling function and, at the receiving site, said other video signal sequence which is scrambled in accordance with said other scrambling function is stored in place of said first video signal sequence which is scrambled in accordance with said first scrambling function, replacing it, and, during this replacement, said other video signal sequence is stored in a scrambled manner in accordance with an actual scrambling function which is equal to a predetermined combination of the first scrambling function and the other scrambling function.

According to an embodiment of the invention, each scrambling function consists in emitting a group of lines of the video image in an order different than a normal order which corresponds to the intelligible image, providing at the receiving site a storage memory comprising a predetermined number of memory lines, each memory line being able to store one received image line, the storage of the one received image line causing the sending of a said previously stored line in this memory line to the TV set, indicating for each emitted image line the address in the memory line in which this emitted image line has to be stored, and determining the emitting time of this image line in such a way that it replaces in the memory a previous image line just at the time when this previous image line has to be sent to the TV set in the normal order of the image lines for generating the intelligible image.

According to an embodiment of the invention, at the emitting site, the scrambling method consists of: allocating to each image line of at least one intelligibly produced image field before its scrambling, the pseudo-random address of the memory line of the storage memory in which this image line will be stored at the receiving site; and determining the emitting time (or emitting order) of this image line to cause, at the receiving site, in response to storage of this image line in the memory line corresponding to its address, the sending of the image line which was previously stored at the same address to the TV set in a sequence of video lines in the normal order for generating the intelligible (or clear) image.

According to an embodiment of the invention, at the transmitting site, the method of scrambling further comprises: permanently maintaining a correspondence table between, on the one hand, the identification number of each image line of at least one frame or field of the intelligibly produced emission before it is scrambled and, on the other hand, its storage address in the storage memory at the receiving site; eventually eliminating from this table said image lines when they are finally sent to the TV set; arranging a number of stacks equal to the number of memory lines of the storage memory used at the receiving site, each stack corresponding to one memory line; successively stacking in each stack the identification number of each image line which will be addressed to the memory line corresponding to that stack during the reception of one or several frames or fields, beginning this procedure with the last line of the field(s) and stacking until the first line of the first frame or field; then, when all the stacks for the field(s) are stacked, carrying out an unstacking of each stack beginning with the bottom of the stack and determining, for each image line thus extracted from the stack by said unstacking, its emitting time (or its emitting order), this emitting time corresponding to the time at which the image line, which is in the same stack just above the image line which has just been unstacked, has to be sent to the TV set for generating the intelligible or clear image.

The present invention will be more fully understood with reference to the following description of an embodiment and to the accompanying drawings in which.

Figure 1:
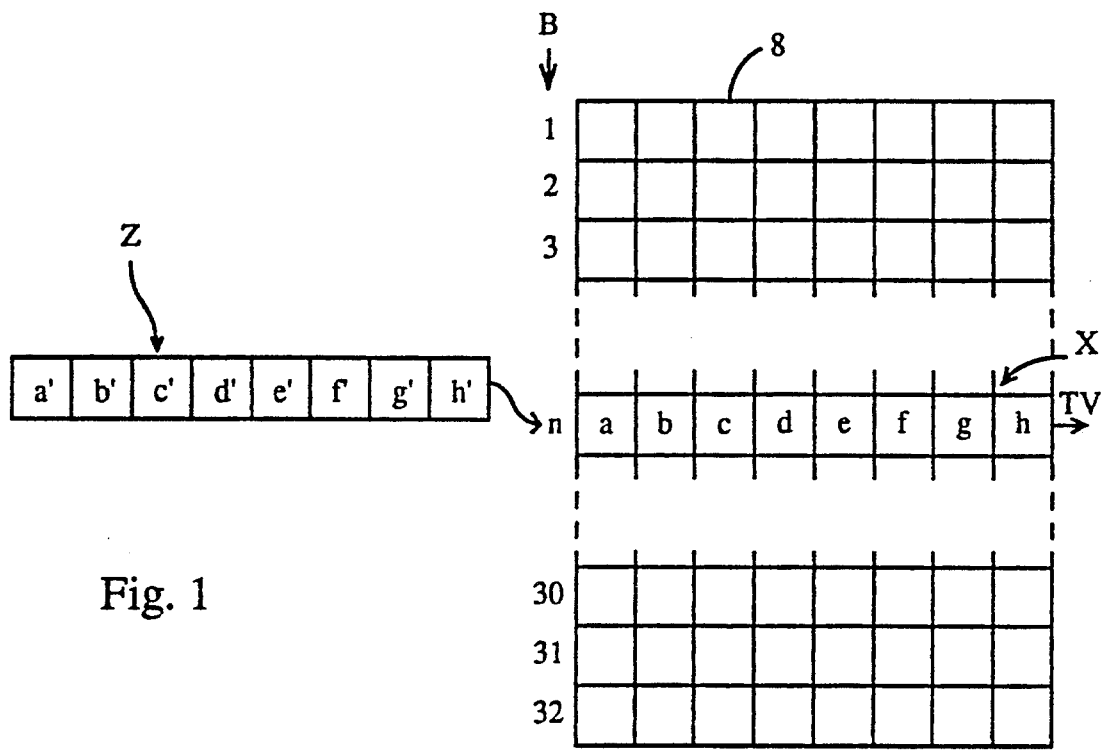
FIG. 1 shows the storage mode in a buffer of a decoder according to the invention.

A digital image (frame or field) line conventionally includes a great number, for example, 256 or 512, of digital samples but only eight samples "a, b, c, d, e, f, g, h" are shown in the drawings for purposes of simplification.

Referring to FIG. 1, an addressing and storage mode of the scrambled image lines received at the subscriber's decoder is illustrated. A storage memory (or buffer) 8 conventionally called a buffer, including 32 memory lines with each memory line being capable of storing the digital information of one full image line, can be seen.

According to the method of the invention, an emitted line Z is sent to the buffer 8 and replaces a previously stored line X in the same memory line n of the buffer 8. The storage of the image line Z in the memory line n of the buffer 8 causes the previously stored image line X to be output and sent to the TV set, possibly after reconditioning or canceling a rotation. Accordingly, the image line emission order depends on the address n of each of the stored lines since each line Z will be emitted only when it replaces a previously stored line X in the buffer memory line corresponding to the Z line address, and only at the time when the previously stored line X is to be sent to the TV set.

It can be seen that the order for emitting the lines (line emission order) is not merely and arbitrarily permuted, but the permutation order is the result of a combination with each image line address in the buffer situated at the receiving site. Thus, the scrambling function by image line permutation is a relative function and not an absolute function.

Figure 2:
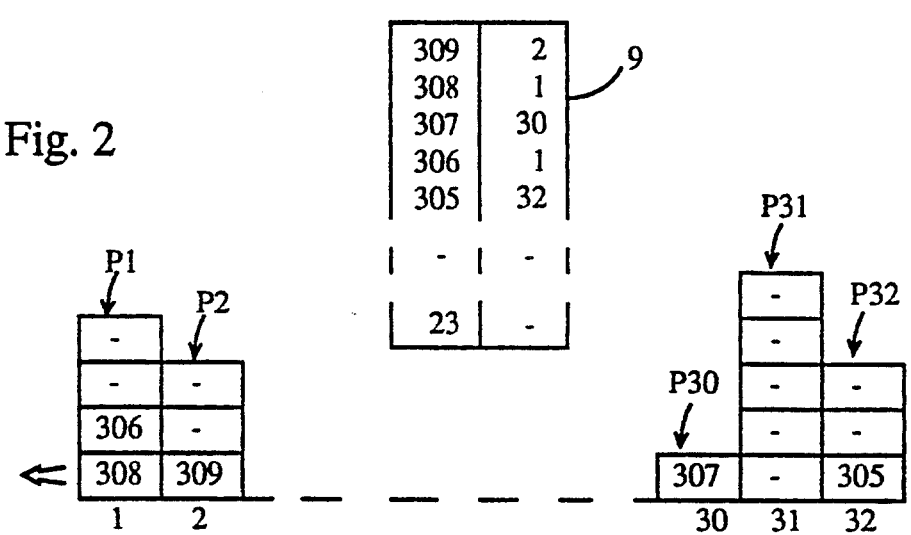
FIG. 2 shows a means for carrying out the scrambling method according to the invention.

According to an embodiment of the invention and with reference to FIG. 2, the scrambling method consists of:

a) permanently maintaining a correspondence table between, on the one hand, the identification number L of each image line of at least one frame or field of the intelligibly produced emission before it is scrambled and, on the other hand, its storage address B in the storage memory (or buffer) 8 at the receiving site;

b) eliminating from this table the image lines when they are finally sent to the TV set to be able to constitute a next table;

c) providing a number B (in this example 32) of stacks P (e.g. P1 to P32) equal to the number B of memory lines of the storage memory (or buffer) 8 used at the receiving site and giving a reference to each stack which is identical to the memory line which corresponds thereto;

d) successively stacking in each stack P the identification number (309, 308, 307, 306, 305, ...) of each image line that will be addressed during the receiving phase to the line of buffer 8 corresponding to this stack, beginning with the last line (in this example line 309) and stacking until the first line is stacked (in this example, the first line is line 23—in a video field, the active lines are conventionally designated by indexes 23 to 309);

e) then, when all of the stacks are thus constituted for the frame(s) or field(s), carrying out an unstacking of each stack (from P1 to P32) by beginning with the bottom of the stack (e.g., for the first stack P1, the extraction begins with 308 then 306, etc ... )

and determining for each image line whose identification number is thus extracted from a stack by said unstacking (e.g., for the line 308) its emitting time, that time being the time which corresponds to the time where the image line in the same stack just above the image line which is unstacked must be sent to the TV set to constitute the intelligible image (in this example, for line 308 the emission time of this line must be the instant when the line 306 is to be sent to the TV set to form the intelligible image;

f) hence, all the image lines of the field(s) to be emitted can be arranged in a memory of great size in accordance with the time where each one will be emitted, and when all the lines of the field(s) are so arranged, it is sufficient to emit the image lines in accordance with their own arrangement in this memory.

Figure 3:
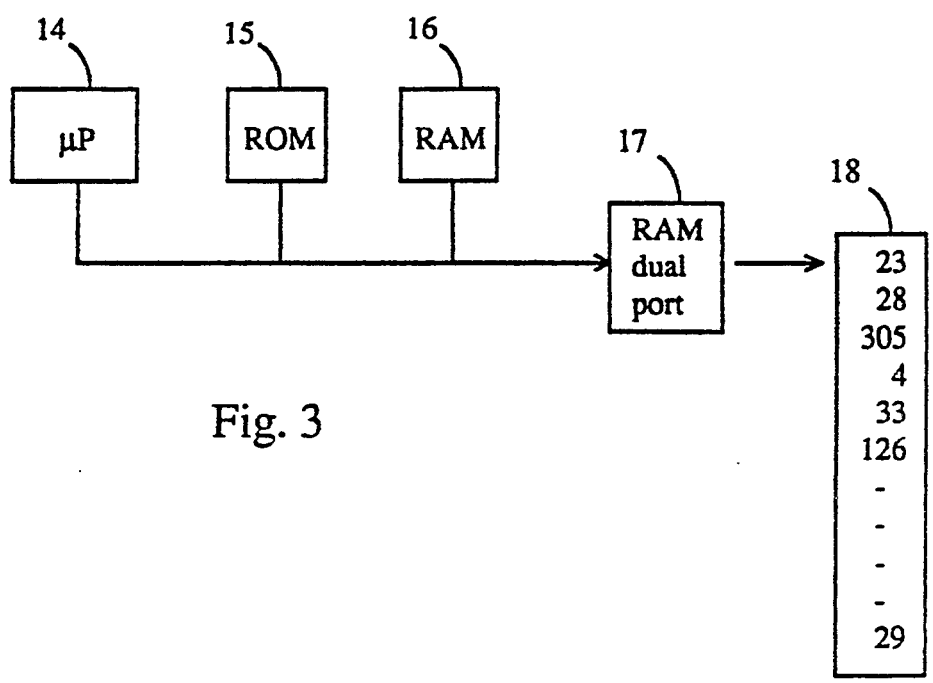
FIG. 3 shows a block diagram of a device for carrying out the invention.

An example of device for carrying out this scrambling method, with referenced to FIG. 2, is shown schematically in FIG. 3. In this figure, a microprocessor ($\mu P$) 14, a RAM 16 and a ROM 15 are shown. The ROM 16 includes a logic processing program for carrying out the logic steps executed in the microprocessor 14, which correspond to the method described above with reference to FIG. 2. The RAM 16 stores variable data during execution of the program. Such a disposition is conventional. This device outputs, via a dual port RAM 17, the series 18 of the image line identification numbers (in the present example the series 23, 28, 305, ... 29) corresponding to the series of image lines as they have to be successively emitted so as to restitute at the receiving site a clear image in a decoder simultaneously receiving a corresponding unscrambling code.

Figure 4:
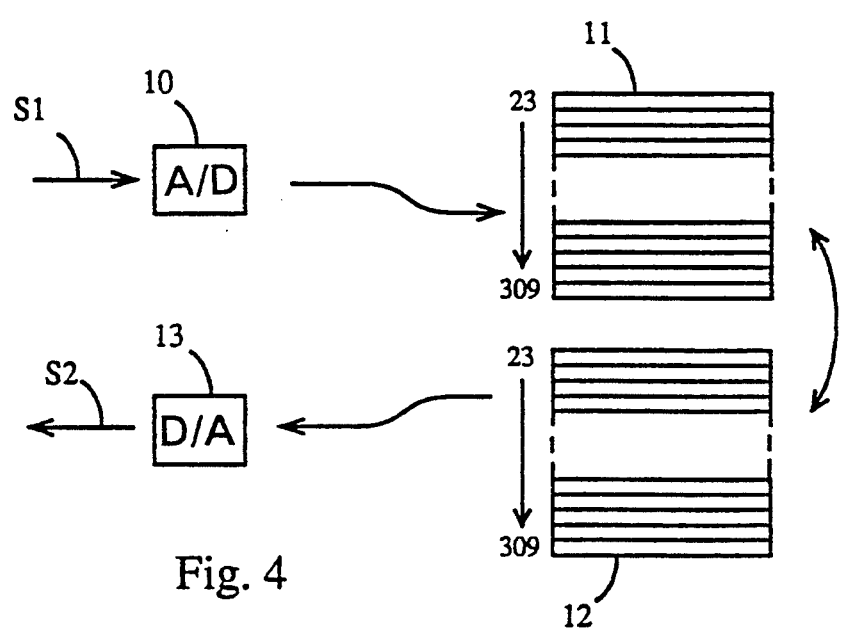
FIG. 4 shows a portion of the device for carrying out the invention.

FIG. 4 shows an embodiment of the remaining portion of the device for carrying out the method of the invention. In this portion, an entry path S1 inputs the intelligible image to the emitting station. This image is digitalized through an A/D converter 10 and is stored in successive lines (e.g. the field lines 23-309) in a buffer 11. During this storing, another identical buffer 12, in which has been stored a previous field, is read with a reading order of the lines (23-309) determined according to the scrambling method of the present invention (with the device of FIG. 3), and each extracted line passes through a D/A converter 13 and is then transmitted, this transmission $2 being scrambled as the lines are not output in natural order (which is lines Nos. 23, 24, . . . , 309).

Three buffers can be used in place of the two buffers 11 and 12 in order to have time during the transition from one buffer to another.

I claim:

1. In a method of scrambling and unscrambling a video signal, comprising emitting a scrambled video sequence at a transmitting site, receiving the scrambled video sequence in a storage memory at a receiving site and unscrambling the received video sequence, wherein the scrambling comprises successively emitting a group of image lines of the video signal in an order different from a normal order of the image lines which corresponds to an intelligible image, the improvement wherein the storage memory at the receiving site comprises a predetermined number of memory lines each having an address, each memory line is able to store one received image line and, in response to the storage therein of a new image line, simultaneously outputs the image line previously stored therein, and the scrambling method at the transmitting side comprises determining for each emitted image line an address of the receiving site memory to which the image line is to be sent and stored in an order which is scrambled in relation to the normal order for generating an intelligible image; and determining at least one of the emitting time and the emitting sequence of each image line so that when each image line is sent to the address of the storage memory at the receiving site, the previous image line stored therein is output in a sequence of image lines in the normal order for generating the intelligible image.

2. The method of claim 1, further comprising the steps of:

associating with each image line of a group of image lines making up an intelligible picture an identification number (23 to 309), each image line being stored in a memory line of the storage memory at the receiving site with a pseudo-random address, and the scrambling method further comprises:

maintaining a correspondence table between the identification number of each image line of a group before scrambling and each image line's storage address in the storage memory at the receiving site;

arranging a number of stacks (P1 to P32) equal to the number of memory lines of the storage memory at the receiving site, each stack corresponding to a memory line of the storage memory;

successively stacking in each stack the identification number of each image line which will be addressed to the corresponding memory line of the storage memory at the receiving site, beginning by stacking the last line (309) and ending by stacking the first line (23) of each group of image lines;

then, when all of the image lines of a group have been stacked, carrying out unstacking of each stack sequentially from the bottom to the top of each stack, and determining for each image line whose identification number is thus extracted from each stack one of the emission time and emission order in which the image line must be emitted from the transmitting site, said one of the emission time and the emission order for each image line corresponding to the time when the image line, whose identification number is stacked just above that which is being unstacked, is to be sent from the storage memory at the receiving site in said sequence of image lines in the normal order for generating the intelligible image.

3. The method of claim 2, further comprising the step of storing, once said one of the emission time and the emission order is determined for each group of image lines and prior to emission thereof, the image lines in a memory at the transmission site in an order corresponding to said one of the emission time and the emission order.

4. The method of claim 1 further comprising the steps of storing, for each group of lines and prior to emission thereof, successive image lines in a transmission memory located at the transmission site, and then reading the image lines stored in said transmission memory in a reading order corresponding to one of the emitting time and the emitting sequence.

* * * * *